United States Patent
Subramanian et al.

(10) Patent No.: US 12,032,858 B1
(45) Date of Patent: Jul. 9, 2024

(54) DATA STORAGE SYSTEM EMPLOYING PARTIAL RESPONSES TO INFLUENCE RATE OF BULK STORAGE OPERATIONS

(71) Applicant: Dell Products L.P., Round Rock, TX (US)

(72) Inventors: Vasudevan Subramanian, Chapel Hill, NC (US); Vamsi K. Vankamamidi, Hopkinton, MA (US); Maher Kachmar, Marlborough, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/120,702

(22) Filed: Mar. 13, 2023

(51) Int. Cl.
    *G06F 3/06* (2006.01)
(52) U.S. Cl.
    CPC .......... *G06F 3/0659* (2013.01); *G06F 3/0611* (2013.01); *G06F 3/067* (2013.01)
(58) Field of Classification Search
    CPC ....... G06F 3/0659; G06F 3/0611; G06F 3/067
    See application file for complete search history.

(56) References Cited

U.S. PATENT DOCUMENTS

| | | |
|---|---|---|
| 8,972,627 B2 | 3/2015 | Strasser et al. |
| 11,610,642 B2 | 3/2023 | Helmick et al. |
| 2012/0203986 A1* | 8/2012 | Strasser ............... G06F 3/0688 711/158 |
| 2023/0342292 A1* | 10/2023 | Govindarajan ..... G06F 11/3037 |

* cited by examiner

*Primary Examiner* — Tasnima Matin
(74) *Attorney, Agent, or Firm* — BainwoodHuang

(57) ABSTRACT

A data storage system continually monitors a loading level of processing requests from host computers relative to a predetermined threshold. In response to the loading level not exceeding a predetermined threshold, a first identification request is responded to with a full response identifying all data blocks over a first complete range of a first bulk storage operation. In response to the loading level exceeding the predetermined threshold, a second identification request is responded to with a partial response identifying a subset of data blocks over only a portion of a second complete range of a second bulk storage operation. The partial response causes a host to first process the subset of data blocks and then send an additional identification request for additional blocks of the second complete range, effectively reducing the rate of bulk storage operations and their effect on other, latency-sensitive operations such as reads and writes.

16 Claims, 3 Drawing Sheets

DATA STORAGE SYSTEM EMPLOYING PARTIAL RESPONSES TO INFLUENCE RATE OF BULK STORAGE OPERATIONS

SUMMARY

A data storage system operates according to a method to influence a rate of bulk storage operations of one or more separate host computers, wherein each bulk storage operation includes a respective identification request (e.g., bitmap request) from a host computer for an identification of respective data blocks to be included in the bulk storage operation. The method includes continually monitoring a loading level of the data storage system processing requests from the host computers relative to a predetermined threshold. In response to the loading level not exceeding the predetermined threshold, a first identification request is responded to with a full response identifying all data blocks over a first complete range of data blocks of a respective first bulk storage operation, enabling the requesting host computer to subsequently initiate a full bulk operation for all the blocks of the full range. In response to the loading level exceeding the predetermined threshold, a second identification request is responded to with a partial response identifying a subset of data blocks over only a portion of a second complete range of data blocks of a respective second bulk storage operation. The partial response causes a requesting host computer to first process the subset of data blocks as part of the second bulk storage operation and then send an additional identification request for additional blocks of the second complete range. The use of the partial response essentially slows down or "throttles" the second bulk storage operation, to limit an adverse performance impact to other, latency-sensitive operations such as regular read and write operations from the hosts.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Figure 1:
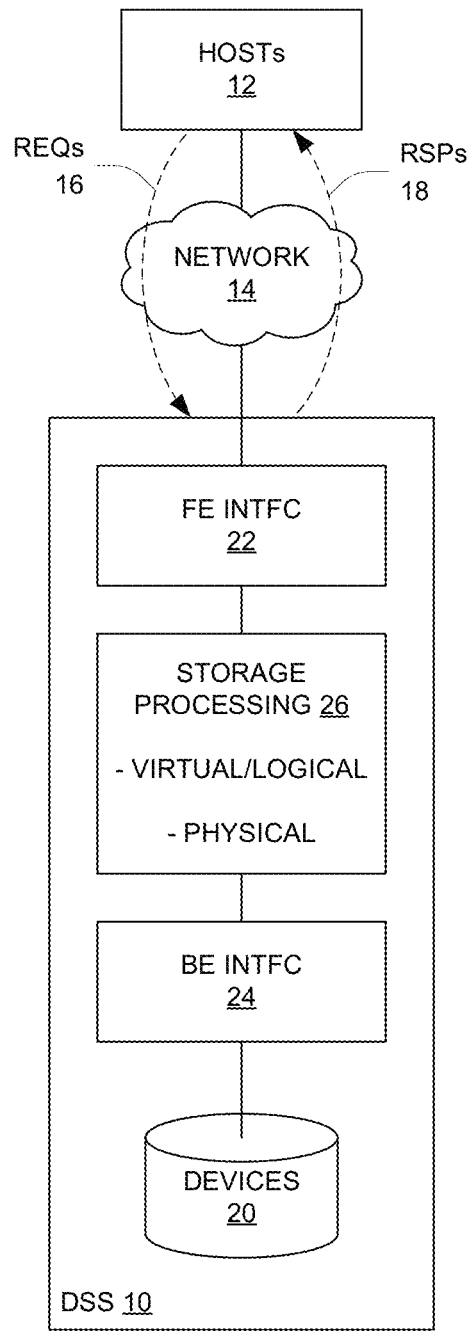
FIG. 1 is a block diagram of a data storage system.

In a large data center, there may be a large number of host computers (hosts) that connect to a single data storage system for storage access. These hosts could be running a variety of operating systems such as ESXi, Linux, Windows, AIX, Solaris and other similar OSs. Some of the operating systems, such as Windows, Linux and ESXi, support clustering of hosts as well. Applications running on these diverse hosts and clusters of hosts are usually totally independent of each other and each of these applications expect performance per their own predefined service level agreements (SLAs). Apart from read and write requests, some or all hosts may also issue other requests for what are referred to herein as "bulk storage operations", which can have a disproportionate need for storage appliance resources and adversely impact performance of regular, latency-sensitive requests such as atomic-test-and-set (ATS), data reads, and data writes.

In one example, some ESXi hosts issue requests such as vVol VASA operations which require a data storage system to perform bulk copy operations based on bitmaps or differences. In VMware, vVol VASA APIs for Bitmap operations include APIs such as:

allocatedBitmap Virtual Volume
unsharedBitmap Virtual Volume

The two APIs have input parameters that specify the vVol(s) of interest, the starting offset, and the length for which the API applies. These two APIs return a bitmap as a response to the APIs with bits being either set or not for each chunk based on the semantic of the operation (i.e., allocated versus unallocated, or unshared versus shared). The Bitmap operation is followed by a bulk data operation (e.g., copy) that uses the bitmap to perform the operation on only the identified blocks or chunks (e.g., copying only allocated chunks and skipping over unallocated chunks). Another feature of the above APIs is the ability for the storage system to return only a partial bitmap as a response i.e., the storage system does not have to satisfy returning the bits for the complete range of (start offset, start offset+length).

A typical user scenario in which bitmap APIs such as above are used is to move a virtual machine (VM), with or without its snapshots, between two storage containers or from a vVol storage container to a VMFS datastore. Such a use case uses a combination of these two APIs and later a request to copy the allocated chunks to the destination. Such operations may not be specifically controlled or regulated in the data path of the storage system and thus may have an undue impact to host latency for other requests from other ESXi hosts or other OSs. However, in many cases the bulk operations are not as time sensitive as ongoing storage operations (reads, writes) of executing applications, and thus from a user or administrative perspective some delay in the bulk operations may be tolerated for the sake of reducing adverse impact on such ongoing storage operations.

As mentioned, in some environments (e.g., VMware VASA) a data storage system is permitted to return partial bitmap results for bitmap APIs, i.e., to not specify the bits for a complete range of requested blocks from Start Offset to (Start Offset+Length). By obtaining a partial bitmap, the application on vCenter will have less copy to do and will need to return to storage for subsequent bitmap API call. This alone has a throttling effect, slowing down the overall rate of the underlying bulk operation. Additionally, the storage system can be permitted to return a response for these bitmap operations within a period as long as 30 seconds, so another throttling effect can be achieved by artificially delaying a response while still meeting the specified limit, such as 30 seconds. Under some scenarios where the storage system is heavily loaded and its resources are being applied for critical requests such as ATS, read and write from other ESXi hosts and other host OSs, the storage system can slow down the VM copy operations for example by using the two techniques mentioned above. This slowing down or throttling is preferably context driven and based on current performance measurements on the storage system, e.g., for the current state of average host latency.

By backing off with artificial delay, the response time for these bitmap requests could be less than the 30 seconds that vCenter uses for aborting the request. Since the delays for the APIs are dynamic based on the current usage of resources on the appliance, ESXi hosts issuing these bitmap operations will slow down only if the scenario demands. This solution works with a single ESXi cluster or with multiple ESXi cluster, because the throttling is being driven by the data storage system which has a central view of the host latency for the requests that it services. Additionally, this approach also works in a multi-appliance storage cluster, because each node in each appliance can throttle based on the current performance characteristics of that node.

In summary, the following are characteristics of a disclosed approach by which a data storage system influences a rate of bulk storage operations of separate hosts, and thereby provides a desired balancing of progress on such bulk operations with acceptable performance of regular, more time-sensitive operations such as host reads and writes:

1. Based on measured average host latency (or other performance characteristic), decide how much of a requested range to return as partial bitmap results.
2. Additionally, utilize an artificial delay in VASA bitmap responses within a specified maximum period (e.g., 30 seconds)

The technique can enable a data storage system to work at scale in a diverse data center with a large number of hosts, by slowing down less critical requests to storage so that more critical operations from hosts can have improved latency, and hence help applications across a system of independent hosts using the same storage. The technique can help to build a cooperative ecosystem of hosts and storage for improved system-wide application performance.

Embodiments

FIG. 1 shows a data processing system having a data storage system (DSS) 10 coupled to host computers (Hosts) 12 via a network 14. As shown, the hosts 12 and DSS 10 exchange requests (REQs) 16 and corresponding responses (RSPs) 18 via the network 14. The DSS 10 provides persistent secondary storage using storage devices 20 such as magnetic disks, Flash memory, etc. The DSS 10 further includes front-end interface circuitry (FE INTFC) 22 for interfacing to the hosts 12, back-end interface circuitry (BE INTFC) 24 for interfacing to the devices 20, and storage processing circuitry 26 that executes storage system software to provide data storage functionality both at a virtual or logical level (e.g., logical and virtual storage devices) as well as at a lower physical level (e.g., physical storage of data on the devices 20). Those skilled in the art will appreciate that the presently disclosed technique is provided in large part by operation of storage system software at the virtual/logical level, relying on generally known techniques for communicating with the hosts 12 and for using the devices 20 for underlying physical data storage.

Figure 2:
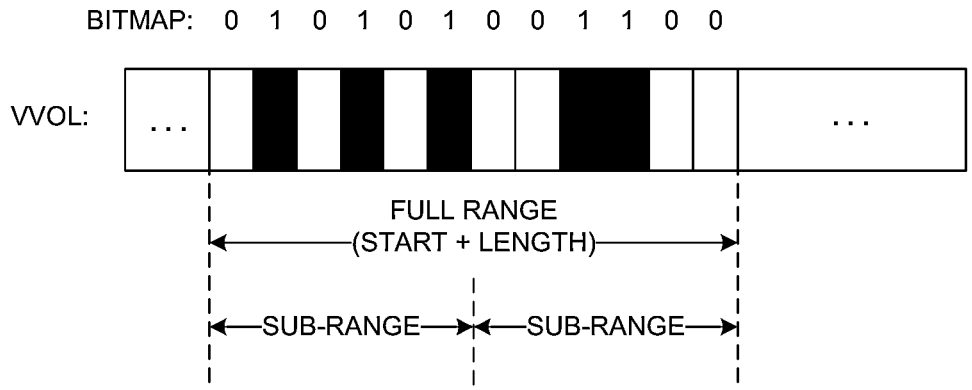
FIG. 2 is a schematic depiction of a virtual volume (vVol) showing block ranges and an example pattern of allocated blocks with associated bitmap.

FIG. 2 is a schematic illustration of an example storage object known as a "virtual volume" or vVol. From the perspective of a host 12, a vVol appears as a distinct storage entity having various characteristics including a size, typically specified in bytes (e.g., 100 GB). Such a storage object is available as a linear or sequential space, with operations being performed at specific locations by identifying a range of addresses within the space (e.g., a range of block addresses, as commonly known). Another feature of some storage objects such as vVols is the possibility that it may be only sparsely populated, meaning that it consumes underlying physical storage resources only as needed. An example of such sparse utilization is indicated by shading in FIG. 2, where shaded areas indicate in-use or allocated blocks and unshaded areas indicate unused or unallocated blocks.

It will be appreciated that bulk operations need only be performed for allocated blocks, and indeed some operations may be undefined if attempted on unallocated blocks. Thus, an initial task of a bulk operation is to obtain an identification of all blocks to be processed, which may be in the form of a "bitmap" as conventionally known and as shown in FIG. 2. A bitmap is a linear array of bits, each having a value indicating the status of the associated block (e.g., "0" for unallocated, and "1" for allocated, as in FIG. 2). FIG. 2 also shows an example full range of a bulk operation, defined by a starting address (e.g., logical block address (LBA)) and a length (e.g., a number of blocks). Also shown are sub-ranges of this full range, which are established implicitly by the use of partial responses as described in more detail below.

Figure 3:
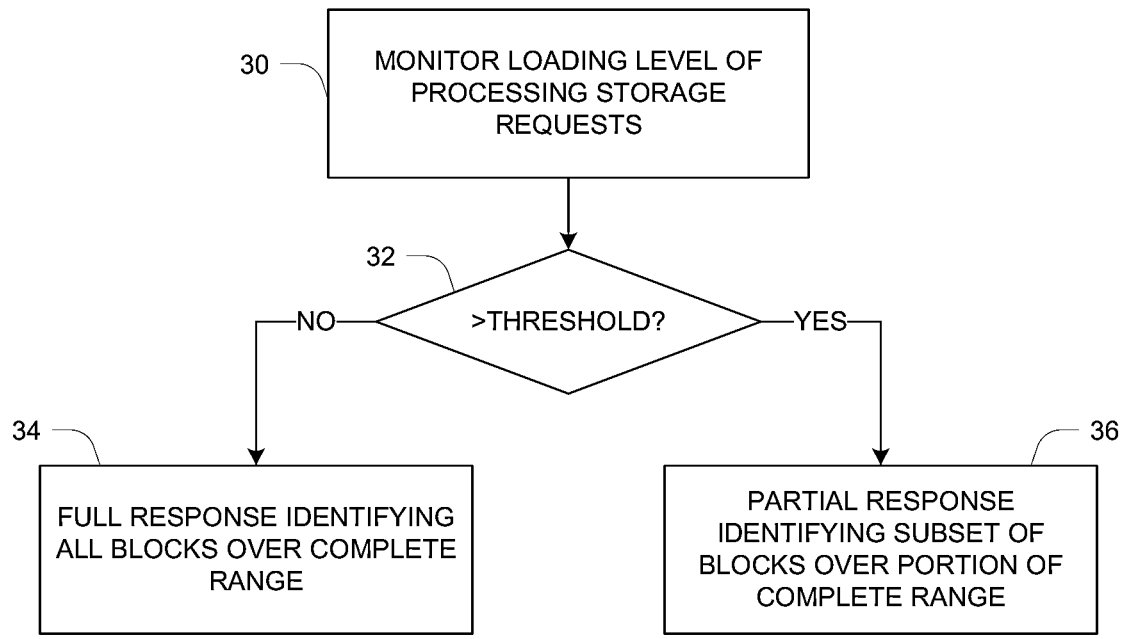
FIG. 3 is a simplified flow diagram of a general technique for returning partial response to an identification request to influence the rate of bulk operations by a requesting host computer.

FIG. 3 is a flow diagram depicting certain operation of the storage processing circuitry 26 in relation to bulk storage operations being performed by the hosts 12. In particular, this operation is one way to enable the DSS 10 to influence a rate of bulk storage operations of the hosts 12, to limit the performance impact of such operations on regular operations (reads and writes) such as described above. As noted above, each bulk storage operation includes a respective identification request from a host computer 12 to the data storage system 10 for an identification of respective data blocks to be included in the bulk storage operation, which in one embodiment may be a Bitmap type of request such as described above. FIG. 3 presents a way of handling such bitmap requests to effect a desired reducing ("throttling") of bulk storage operations.

At 30, the storage system 10 continually monitors a loading level of the data storage system processing requests from the host computers 12. This monitoring may be accomplished in a variety of ways, including for example by tracking the delay or latency of requested operations and calculating a representative statistic such as an average latency. This is performed for at least latency-sensitive requests such as regular read and write operation, ATS, etc.

At 32, upon receiving an identification request, a test is performed to ascertain the current level of loading relative to a predetermined threshold that is indicative of a corresponding performance impact. Again taking the example of a latency measure, step 32 could involve comparing the current value of a measured average latency to a predetermined maximum desired latency for regular operations, e.g., 10 mSec for example. If this threshold is not exceeded, then processing proceeds to step 34, and if it is exceeded, then processing proceeds to step 36.

At 34, in response to the loading level not exceeding the predetermined threshold, the identification request is responded to with a full response that identifies all data blocks over a first complete range of data blocks of the bulk storage operation. Referring to FIG. 2, this response is a bitmap covering all blocks across the full range of the request. This full response enables the requesting host computer to subsequently initiate a full bulk operation for all the blocks of the full range, e.g., a request to copy all those blocks from the existing vVol to a new vVol. This full-response operation is allowed, notwithstanding its performance impact, because the test at 32 indicates that overall performance is currently acceptable and thus there is no need to throttle the bulk operation.

At 36, in response to the loading level exceeding the predetermined threshold, the identification request is responded to with a partial response identifying a subset of data blocks over only a portion of the complete range of data blocks of the bulk storage operation. Referring to FIG. 2, this response is a bitmap covering the set of blocks in a sub-range of the full range. This partial response causes the requesting host computer to first process the subset of data blocks as part of the bulk storage operation and then later send an additional identification request for additional blocks of the second complete range (e.g., a second sub-range in FIG. 2), which is effectively a throttling of the bulk operation. This partial-response operation is done to reduce the performance impact of the bulk operation, because the test at 32 indicates that overall performance is now less than desired so this throttling of the bulk operation is used.

The general technique of FIG. 3 can be used with various additions and variations, some of which are now described in some detail.

Figure 4:
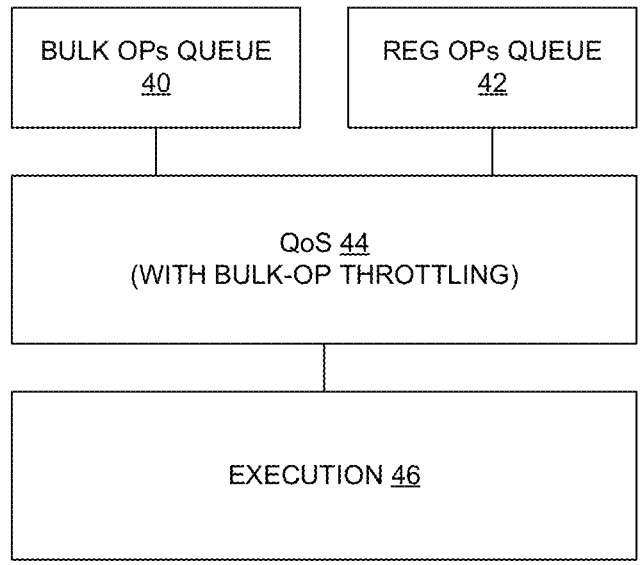
FIG. 4 is a block diagram of certain structure of storage processing circuitry.

FIG. 4 shows certain relevant structure and functionality of the storage processing circuitry 26 in some embodiments. It utilizes separate queues 40, 42 for bulk operations (Bulk Ops) and regular operations (Reg Ops, e.g., application reads and writes) respectively. A Quality of Service (QOS) component 44 manages the selection and timing of queued operations to be performed by an execution component 46. The functionality of the presently disclosed technique is provided primarily by the QoS component 44, as described in detail below. It will be appreciated that operation embodies the generalized technique of FIG. 3, as well as additional features.

Figure 5:
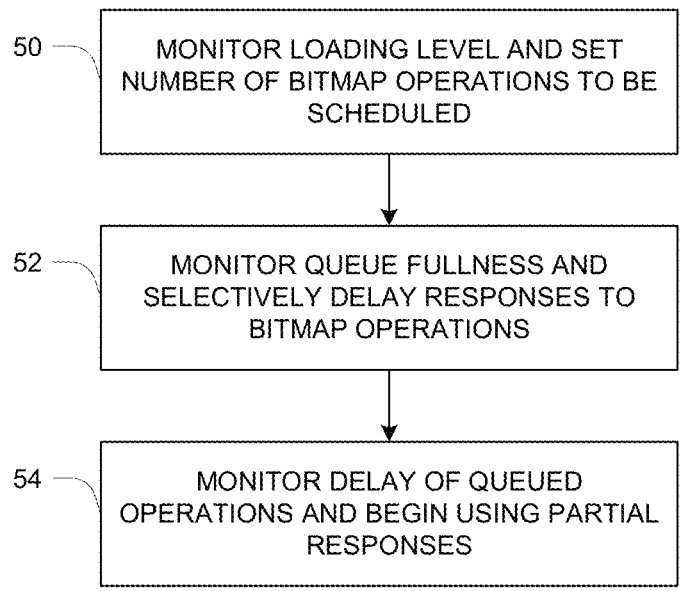
FIG. 5 is a simplified flow diagram of a more specific technique of influencing a rate of bulk operations using three separate mechanisms including the technique of FIG. 3.

FIG. 5 illustrates certain operation of the QoS component 44 of FIG. 5, which reflects a three-level response strategy for managing the rate of handling bulk operations that include initial identification requests such as bitmap requests. It is assumed that new requests are added to the respective queue 30, 32 as they are received from the hosts 12, i.e., bitmap requests are placed in the bulk operations queue 40, and regular requests (reads, writes, etc.) are placed in the regular operations queue 42.

At 50, the QoS component 44 continuously measures current load on the data storage system 10 and sets the number of Bitmap operations to be scheduled for execution at a given time (e.g., a maximum of 5 or 10, for example). This limit number is generally inversely proportional to system loading, i.e., it may be reduced as loading increases and be increased as loading falls. The scheduling may be performed using a leaky-bucket algorithm, for example, in which the number of tokens available for Bitmap Operations is determined by impact to regular host IOs. Thus, if there is no impact to host IOs, Bitmap Operations will be completed normally (quickly scheduled), and if there is impact to Host IOs, they will be slowed down (more selectively scheduled).

At 52, as another mechanism, after completion of a Bitmap operation, if the bulk operations queue 40 has many pending requests waiting for execution, the response on the completed Bitmap operation can be delayed up to some maximum value (e.g., 25 seconds). Assuming that a host 12 waits for completion of one bitmap request before issuing another, this delay can have the effect of slowing down the overall rate of Bitmap operations being submitted to the storage system 10.

At 54, as an additional mechanism, if the bulk operations queue 44 has many pending Bitmap operations waiting for execution and accumulating delay, Bitmap operations being scheduled can be flagged to indicate that only partial results should be returned, as described above with reference to FIG. 3. Thus for example, if a Bitmap operation at the time of scheduling has already accumulated 5 seconds delay in the queue 44, the system returns a partial response covering some sub-range (e.g., half) of the requested range.

The benefit of delaying the Bitmap operations (either thru response delay at 52 or partial result at 54) is not only to slow down Bitmap operations but to also slow down host submission of other background operations such as extended copy (Xcopy) which are dependent on results of Bitmap Operations.

There may be additional factors that modify the operation of FIG. 5. For example, in case Bitmap operations are approaching timeout thresholds while waiting for scheduling in the bulk operations queue 40, their priority may be elevated by the QoS 44 (e.g., more tokens are made available for their scheduling) to avoid disruptive time-outs of pending requests/operations. In this scenario, it may still be desirable to flag new requests to return only partial results (step 54).

The process of FIG. 5 uses the general technique of FIG. 3 in a particular way, i.e., as the third mechanism 54 performed under particular circumstances and along with the other mechanisms 50, 52 as shown. It will be appreciated that this is only one particular example use, and that the general technique of FIG. 3 may be used in other specific manners as the needs and capabilities of an operating platform (i.e., data storage system) may dictate.

While various embodiments of the invention have been particularly shown and described, it will be understood by those skilled in the art that various changes in form and details may be made therein without departing from the scope of the invention as defined by the appended claims.

What is claimed is:

1. A method of operating a data storage system to influence a rate of bulk storage operations of one or more separate host computers, each bulk storage operation including a respective identification request from a host computer to the data storage system for an identification of respective data blocks to be included in the bulk storage operation, the method comprising steps, by the data storage system, of:
   continually monitoring a loading level of the data storage system processing requests from the host computers relative to a predetermined threshold;
   in response to the loading level not exceeding the predetermined threshold, responding to a first identification request with a full response identifying all data blocks over a first complete range of data blocks of a respective first bulk storage operation; and
   in response to the loading level exceeding the predetermined threshold, responding to a second identification request with a partial response identifying a subset of data blocks over only a portion of a second complete range of data blocks of a respective second bulk storage operation, the partial response causing a requesting host computer to first process the subset of data blocks as part of the second bulk storage operation and then send an additional identification request for additional blocks of the second complete range.

2. The method of claim 1, wherein the monitoring includes (1) tracking latencies of latency-sensitive requests separate from the bulk storage operations and calculating an average latency, and (2) comparing a current value of the average latency to a predetermined maximum desired latency for the latency-sensitive requests.

3. The method of claim 1, wherein the identification requests are bitmap requests for identification of data blocks over a requested range in the form of respective bitmaps.

4. The method of claim 3, wherein the bitmap requests include an allocated-bitmap request identifying allocated data blocks over the requested range, and an unshared-bitmap request identifying unshared data blocks over the requested range.

5. The method of claim 1, wherein the data storage system maintains distinct queues including a bulk-operations queue for bulk storage operations and a regular-operations queue for regular operations, the bulk-storage operations including their respective identification requests, the regular operations including application reads and writes, and wherein a quality of service (QOS) component manages selection and timing of queued operations to be performed by an execution component.

6. The method of claim 5, wherein responding to the second identification request with the partial response is a partial-response mechanism used at one level of a three-level response strategy of the QoS component, the three-level response strategy including (1) setting a number of identification requests to be scheduled for execution at a given time, the number being generally inversely proportional to the loading level, (2) selectively delaying responses to the identification requests to slow down a pace of the hosts performing the bulk storage operations, and (3) in response to the bulk-operations queue having at least a threshold number of pending identification operations waiting for execution and accumulating delay, flagging queued identification requests to use the partial-response mechanism and provide only partial results.

7. The method of claim 6, wherein the selective delaying operation at level (2) is modified by, in response to queued identification requests approaching timeout thresholds while waiting for scheduling in the bulk-operations queue, increasing priority of the queued identification requests to promote earlier execution and avoid disruptive time-outs.

8. The method of claim 7, wherein, in addition to increasing priority of the queued identification requests at level (2), continuing to also use the partial-response mechanism of level (3) for the increased-priority requests.

9. A data storage system comprising storage devices and electronic circuitry for providing persistent secondary storage to separate host computers, the electronic circuitry including storage processing circuitry configured and operative to execute storage system software to cause the data storage system to influence a rate of bulk storage operations of the host computers, each bulk storage operation including a respective identification request from a host computer to the data storage system for an identification of respective data blocks to be included in the bulk storage operation, by:
continually monitoring a loading level of the data storage system processing requests from the host computers relative to a predetermined threshold;
in response to the loading level not exceeding the predetermined threshold, responding to a first identification request with a full response identifying all data blocks over a first complete range of data blocks of a respective first bulk storage operation; and
in response to the loading level exceeding the predetermined threshold, responding to a second identification request with a partial response identifying a subset of data blocks over only a portion of a second complete range of data blocks of a respective second bulk storage operation, the partial response causing a requesting host computer to first process the subset of data blocks as part of the second bulk storage operation and then send an additional identification request for additional blocks of the second complete range.

10. The data storage system of claim 9, wherein the monitoring includes (1) tracking latencies of latency-sensitive requests separate from the bulk storage operations and calculating an average latency, and (2) comparing a current value of the average latency to a predetermined maximum desired latency for the latency-sensitive requests.

11. The data storage system of claim 9, wherein the identification requests are bitmap requests for identification of data blocks over a requested range in the form of respective bitmaps.

12. The data storage system of claim 11, wherein the bitmap requests include an allocated-bitmap request identifying allocated data blocks over the requested range, and an unshared-bitmap request identifying unshared data blocks over the requested range.

13. The data storage system of claim 9, wherein the data storage system maintains distinct queues including a bulk-operations queue for bulk storage operations and a regular-operations queue for regular operations, the bulk-storage operations including their respective identification requests, the regular operations including application reads and writes, and wherein a quality of service (QOS) component manages selection and timing of queued operations to be performed by an execution component.

14. The data storage system of claim 13, wherein responding to the second identification request with the partial response is a partial-response mechanism used at one level of a three-level response strategy of the QoS component, the three-level response strategy including (1) setting a number of identification requests to be scheduled for execution at a given time, the number being generally inversely proportional to the loading level, (2) selectively delaying responses to the identification requests to slow down a pace of the hosts performing the bulk storage operations, and (3) in response to the bulk-operations queue having at least a threshold number of pending identification operations waiting for execution and accumulating delay, flagging queued identification requests to use the partial-response mechanism and provide only partial results.

15. The data storage system of claim 14, wherein the selective delaying operation at level (2) is modified by, in response to queued identification requests approaching timeout thresholds while waiting for scheduling in the bulk-operations queue, increasing priority of the queued identification requests to promote earlier execution and avoid disruptive time-outs.

16. The data storage system of claim 15, wherein, in addition to increasing priority of the queued identification requests at level (2), continuing to also use the partial-response mechanism of level (3) for the increased-priority requests.

* * * * *